United States Patent [19]

Hosono et al.

[11] 4,223,344
[45] Sep. 16, 1980

[54] BEAM INDEX COLOR CATHODE RAY TUBE

[75] Inventors: Takashi Hosono, Yokohama; Akio Ohkoshi, Tokyo; Takashi Tooyama, Kokubunji; Akira Tooyama; Takahiro Yukawa, both of Tokyo, all of Japan

[73] Assignee: Sony Corporation, Tokyo, Japan

[21] Appl. No.: 969,975

[22] Filed: Dec. 15, 1978

[30] Foreign Application Priority Data

Dec. 21, 1977 [JP] Japan ............................ 52-154067
Dec. 24, 1977 [JP] Japan ............................ 52-155884

[51] Int. Cl.² ............................................. H04N 9/24
[52] U.S. Cl. .................................................. 358/67
[58] Field of Search ............................. 358/67, 69, 70

[56] References Cited

U.S. PATENT DOCUMENTS

| | | | |
|---|---|---|---|
| 2,791,626 | 5/1957 | Hergenrother | 358/70 |
| 2,945,087 | 7/1960 | Graham et al. | 358/69 |
| 3,041,392 | 6/1962 | Keiper, Jr. et al. | 358/69 |
| 3,249,688 | 5/1966 | Davidse et al. | 358/69 |
| 3,294,899 | 12/1966 | Davidse et al. | 358/67 |
| 4,003,082 | 1/1977 | Fumoto | 358/69 |

*Primary Examiner*—Richard Murray
*Attorney, Agent, or Firm*—Lewis H. Eslinger; Alvin Sinderbrand

[57] ABSTRACT

A beam index color cathode ray tube has index stripes spaced apart across a run-in area of the screen which have a pitch substantially equal to the pitch of index stripes in an image area, and a predetermined number of the index stripes in the run-in area are counted as an electron beam scans them to preset color control circuits to a predetermined condition at the commencement of scanning of the image area. A characteristic of the signal resulting from scanning of the index stripes may be used to begin the counting thereof from a specific one of the index stripes in the run-in area other than the first one encountered by the electron beam.

28 Claims, 50 Drawing Figures

FIG. 1

PRIOR ART

FIG. 2

PRIOR ART

FIG. 3

PRIOR ART

BEAM INDEX COLOR CATHODE RAY TUBE

BACKGROUND OF THE INVENTION

1. Field of the Invention

The present invention relates generally to a beam index color cathode ray tube, and more particularly to a beam index color cathode ray tube which can reproduce color with high fidelity.

2. Description of the Prior Art

In a prior art beam index color cathode ray tube, a single electron beam scans a target screen which consists of triads of parallel red, green and blue vertical color phosphor stripes sequentially repeating across the screen. The color phosphor stripes are sequentially scanned by a scanning electron beam which crosses the color phosphor stripes horizontally in sequence from one side of the screen to the other. Index phosphor stripes are provided on the inner surface of the screen parallel to and in known relationship to the color phosphor stripes. As the electron beam scans horizontally across the screen, it excites the index phosphor stripes into producing a light signal behind the screen. Such light signal is detected by a photodetector to produce an index signal which has a known relationship to the instantaneous position of the electron beam on the screen.

The index signal is used to control the modulation of the electron beam such that the electron beam is density modulated with the red primary color signal when the beam scans across a red phosphor stripe, with the green primary color signal when the beam scans across a green phosphor stripe and with the blue primary color signal when the beam scans across a blue phosphor stripe, respectively.

Figure 1:
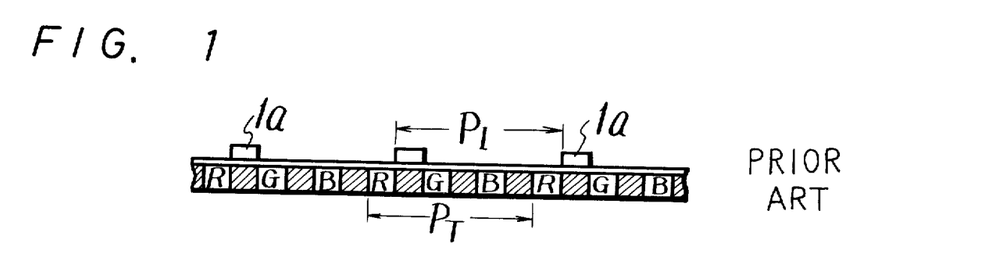
FIGS. 1 to 3 are fragmentary cross-sectional views of prior art beam index color cathode ray tube screens showing arrangements of index and color phosphor stripes.
Figure 2:
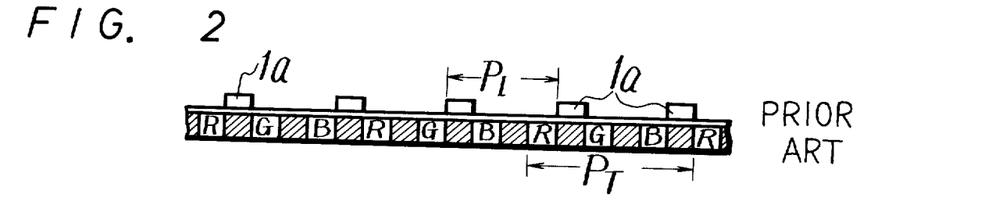
Figure 3:
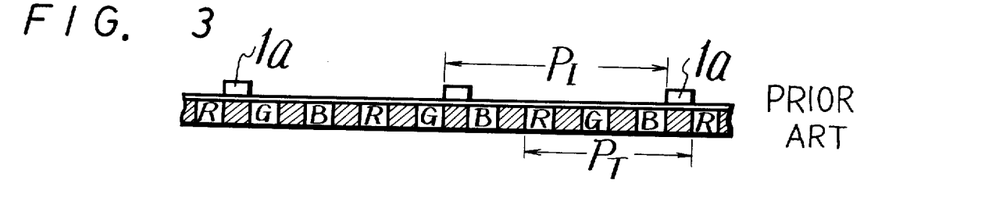

FIGS. 1-3 show arrangements of index phosphor stripes on the inner surface of the screen in prior art color cathode ray tubes. In FIG. 1, the pitch $P_I$ of the index phosphor stripes $1a$ is the same as, or an integral multiple of, the pitch $P_T$ of each triad of red, green and blue color phosphor stripes R, G and B. The positional relationship between the index phosphor stripes $1a$ and the respective triads of red, green and blue color phosphor stripes R, G and B is fixed and readily determined from the index signal and hence there is no need to provide a special circuit which establishes synchronization of the color modulation by the index signal and accordingly a simple circuit is sufficient.

Since the positional relation between the index phosphor stripes $1a$ and the red, green and blue phosphor stripes R, G and B is fixed, any phase shift in the index signal produced, for example, by color modulation of the scanning beam results in faulty color synchronization and degrades color reproduction fidelity. This is especially noticeable in the reproduction of highly saturated color since the high electron beam current for a particular highly saturated color creates an apparent shift in phase of the index signal.

For the above reason, a one-to-one relationship between index phosphor stripes $1a$ and color phosphor stripe triads is not desirable. Therefore, the arrangements in FIGS. 2 and 3 are used. The pitch $P_I$ of the index phosphor stripes $1a$ is selected to be a non-integral multiple of the pitch $P_T$ of the triads of color phosphor stripes. Thus, pitches $P_I$ of $\frac{2}{3}$, 4/3 or generally $3n\pm1)/3$ (where n is 0, 1, 2, - - - ) of the pitch $P_T$ of the triads of red, green and blue color phosphor stripes R, G and B may be used. With the foregoing arrangement, the positional relationships between the index phosphor stripes $1a$ and the triads of red, green and blue color phosphor stripes R, G and B are varied sequentially so that a phase shift in an index signal due to a reproduced color signal does not appear uniformly across the screen and hence the color reproduction is achieved with higher fidelity.

With the latter arrangement, however, the variation in positional relationships across the screen between the index phosphor stripes $1a$ and the triads of red, green and blue color phosphor stripes R, G and B, requires a synchronization technique to establish color synchronization.

Figures 4, 5, 6:
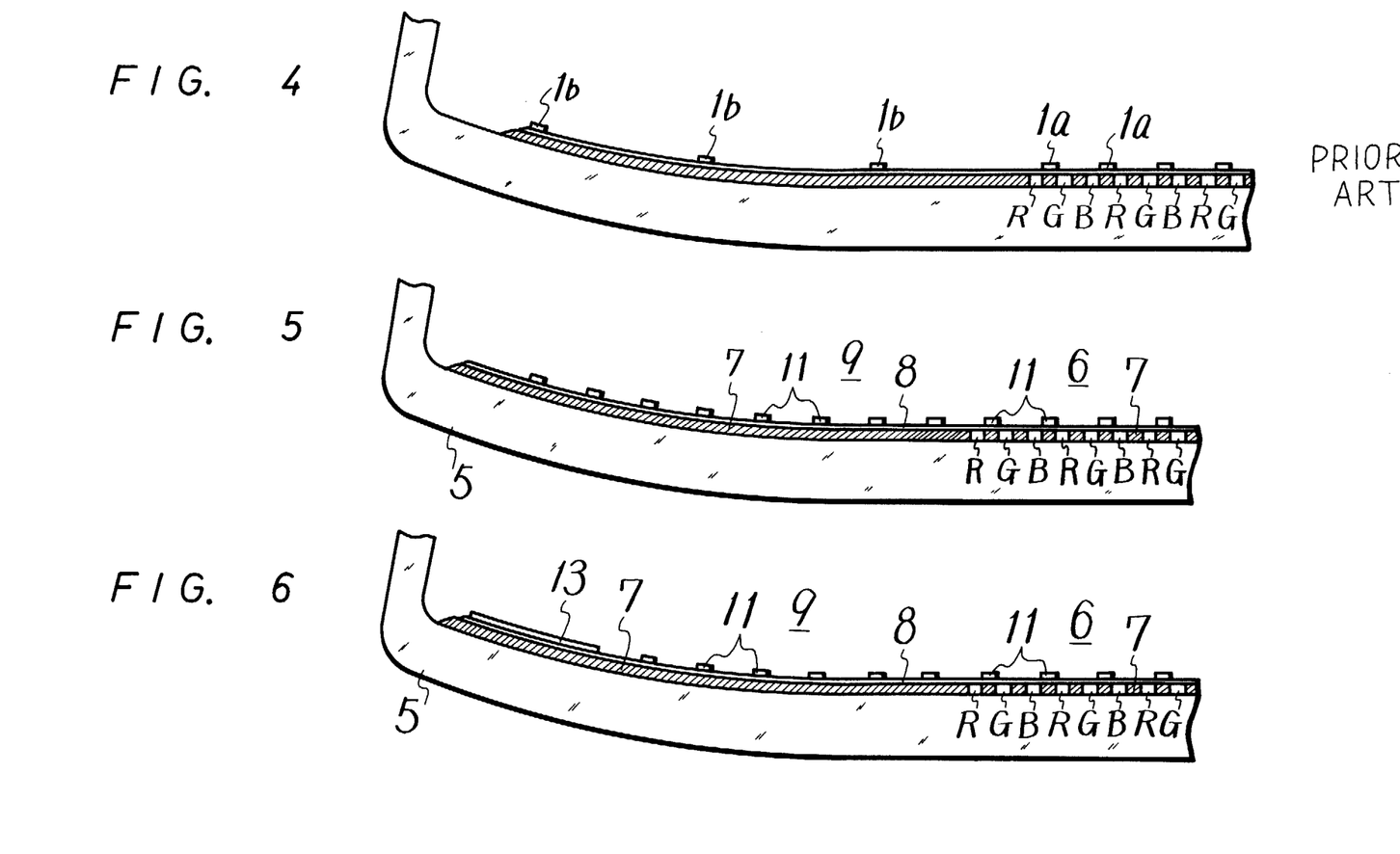
FIG. 4 is a cross-sectional view of part of the screen, including the run-in area, in a prior art beam index color cathode ray tube.
FIGS. 5 and 6 are cross-sectional views similar to FIG. 4, but showing embodiments of beam index color cathode ray tubes according to the present invention.

One way to establish color synchronization is to provide a means for determining when the electron beam begins scanning across the color phosphor stripes and to thereafter keep a running count of the index phosphor stripes that are scanned or crossed. A method of accomplishing this is shown in FIG. 4. The index phosphor stripes $1a$ are provided across the image area of the screen in non-integral spaced relationship with the triads of color phosphor stripes R, G and B, as previously described, and, in addition, a set of synchronizing index phosphor stripes $1b$ are provided on the beam scanning run-in or marginal area outside the image area of the screen. In order to distinguish between the run-in area and the image area, and thus to be able to discern the transition from one area to the other, the pitch of the index phosphor stripes $1b$ in the run-in area is made suitably larger, for example, three times, the pitch of the index phosphor stripes $1a$ in the viewing or image area. The index signal obtained when the beam scans the index phosphor stripes $1b$ in the run-in area is used to establish color synchronization. However, since a plurality of phosphor stripes $1b$ are necessary in the run-in area and the pitch of the index phosphor stripes $1b$ is large, the width of the marginal portion of the screen must also be large when using the described scheme according to the prior art. In addition, if noise is mixed with the index signal from the run-in area, the noise can sometimes occur in positions which simulate the index signal from the viewing area. When this happens, color synchronization is displaced and incorrect colors are reproduced.

OBJECTS AND SUMMARY OF THE INVENTION

Accordingly, an object of the present invention is to provide a novel beam index color cathode ray tube free from the described defects encountered in the prior art.

Another object of the invention is to provide a beam index color cathode ray tube in which color synchronization can be performed correctly.

Still another object of the invention is to provide a beam index color cathode ray tube in which color synchronization is free from disturbance by noise.

A further object of the invention is to provide a beam index cathode ray tube in which the pitch of at least most of the index stripes in the run-in area is equal to the pitch of the index stripes in the image area.

It is a further object of the invention to provide a beam index cathode ray tube, as aforesaid, with a run-in area of reduced dimensions.

It is a further object of the invention to provide a control system for a beam index cathode ray tube which provides a constant beam control signal while the electron beam is scanning a run-in area containing index stripes.

It is a further object of the invention to control the synchronization of a beam index cathode ray tube using a phase locked loop in order to avoid loss of synchronization due to momentary spurious noise signals or index signal losses.

It is a further object of the invention to provide a beam index cathode ray tube which includes means for avoiding faulty synchronization by false triggering by noise in the extreme peripheral portion of the run-in area.

It is a further object of the invention to provide a beam index cathode ray tube in which a wide phosphor index stripe in the extreme peripheral portion of the run-in area raises the signal level in that area to a level which avoids false triggering by noise.

It is a further object of the invention to provide a beam index cathode ray tube employing the counting of the passage of an electron beam over a predetermined number of index stripes before entering an image area to establish color synchronization in which a resetting means before the predetermined number of index stripes ensures beginning the counting of the predetermined number from a known point. This avoids the starting point of color control signals being shifted forward by noise which occurs before the electron beam reaches the first of the predetermined number.

According to an aspect of the invention, on the screen portion of a beam index cathode ray tube having an image area with repetitive sets of parallel color phosphor stripes having a first pitch and a run-in area contiguous to an edge of the image area, a first set of index stripes is disposed on the image area parallel to the color phosphor stripes and has a second pitch different from the first pitch. A second set of index stripes is disposed on the run-in area and has the same pitch as the first set of index stripes, and means are provided responsive to the electron beam scanning over the first and second sets of index stripes for generating an index signal.

According to another aspect of the invention, there is provided a control circuit for a beam index cathode ray tube of the type which generates an index signal indicative of the position of a scanning beam, and which comprises means for generating a pulse signal having a frequency related to the frequency of the index signal, and counting means enabled by a synchronizing signal for counting cycles of the index signal and generating a trigger signal upon counting a predetermined number of cycles of the index signal. A frequency divider, which is operative in response to the pulse signal to generate a sequential plurality of color control signals for sequentially controlling the application of respective color signals to the cathode ray tube, is preset to assume a predetermined condition by the trigger signal to provide synchronization of the color control signals.

In one embodiment of the invention, a broad index stripe is optionally provided at the outer perimeter of the run-in area. The broad index stripe raises the average signal level in that region to a high enough level to avoid triggering by noise. Preferably, the instantaneous index signal level from the broad index stripe is made equal to the average level of the index signal as the electron beam scans across the normal width index stripes.

It is a further feature of the invention to provide a gap, which is different from the pitch of the index stripes, between at least two index stripes near the outer perimeter of the run-in area. The resulting gap in the index signal is usable by control circuits to preset a counter which then begins counting the predetermined number of index stripes crossed by the electron beam before entering the image area.

A control circuit employing the gap in the index signal to preset the counter uses a retriggerable monostable multivibrator or the like which has a period just exceeding the normal period of the index signal. The retriggerable multivibrator resets the counter only when the end of its period is reached. If the retriggerable multivibrator is retriggered before the end of its period, its output remains unchanged for an additional period. Thus, an index signal consisting of cycles all having normal spacing continues to retrigger the retriggerable multivibrator before its period ends and thus prevents the resetting of the counter. When the gap occurs, the retriggerable multivibrator reaches the end of its period before being retriggered and the counter is thereby reset in preparation for counting a predetermined remaining number of cycles of the index signal from the run-in area.

The means for generating a pulse signal is preferably a phase locked loop, and most preferably a phase locked loop in which the frequency of its output is an integral multiple, advantageously twice, the frequency of the index signal.

The above, and other objects, features and advantages of the present invention, will become apparent from the following description read in conjunction with the accompanying drawings in which like reference numerals and letters designates the same elements.

DESCRIPTION OF THE PREFERRED EMBODIMENTS

Referring now to FIG. 5, there is shown an embodiment of a beam index color cathode ray tube according to the present invention. A screen 5 of the beam index color cathode ray tube has vertically arranged on its inner surface, parallel triads of red, green and blue color phosphor stripes R, G and B. The triads are repeated in the horizontal scanning direction to define an image area 6. A black layer 7 is coated on the inner surface of the screen 5 between the adjacent color phosphor stripes R, G and B and on the entire marginal run-in area 9 outside the image area 6. The black layer 7 may be of any suitable material but is preferably of carbon or the like. A metallic back layer 8 for example, of aluminum, is thinly coated over the entire rear surface of the screen 5 including the color phosphor stripes R, G, B and black material layer 7. The metallic back layer 8 is substantially transparent to electrons but is an effective light reflector. Thus, the electron beam penetrates back layer 8 to excite the color phosphor stripes 1a but most of the light emitted is reflected forward to the viewer rather than being directed into the cathode ray tube.

Index phosphor stripes 11 are formed on the metal back layer 8 over the image area 6 and over the beam scanning run-in marginal area 9 at one side of the image area. The index phosphor stripes 11 in the image area 6 are located in the space between adjacent color phosphor stripes. The pitch of the index phosphor stripes 11 in the beam scanning run-in marginal area 9 and the image area 6 is equal to $\frac{2}{3}$ of the pitch of the triads of color phosphor stripes R, G, B. Although a pitch of $\frac{2}{3}$ is shown in FIG. 5, in general, any pitch having the relationship of $(3n \pm 1)/3$ to the pitch of the triads of color phosphor stripes R, G and B may be used.

Generally, in accordance with this invention, the number of the index phosphor stripes 11 on the marginal portion 9 is counted and the counter output, for example 8, is utilized to establish color synchronization.

Figure 8:
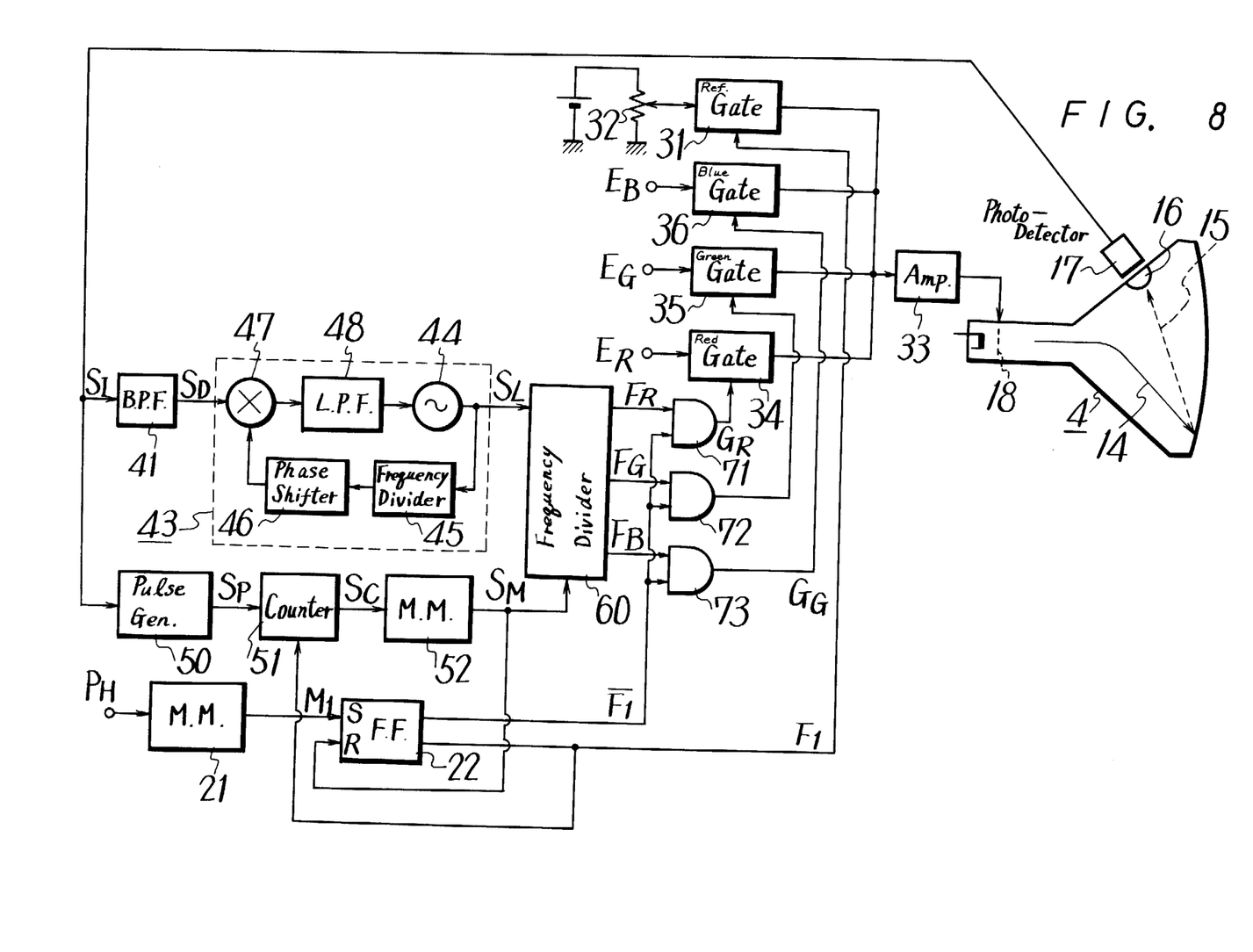
FIG. 8 is a block diagram showing a television receiver in which an embodiment of a beam index color cathode ray tube according to the present invention is employed.

Turning now to FIG. 8, a beam index color cathode ray tube 4 having the arrangement of index stripes 11 shown in FIG. 5, is shown further to have a lens 16 on the inner surface of the funnel portion. The lens 16 receives light radiation represented by dashed line 15 which is emitted by the index phosphor stripes (not shown in FIG. 8) as an electron beam 14 scans over them. Outside the funnel portion a photodetector 17 is disposed in a location where it can receive the light radiation 15 collected by the lens 16.

Figures 10A, 10B, 10C:
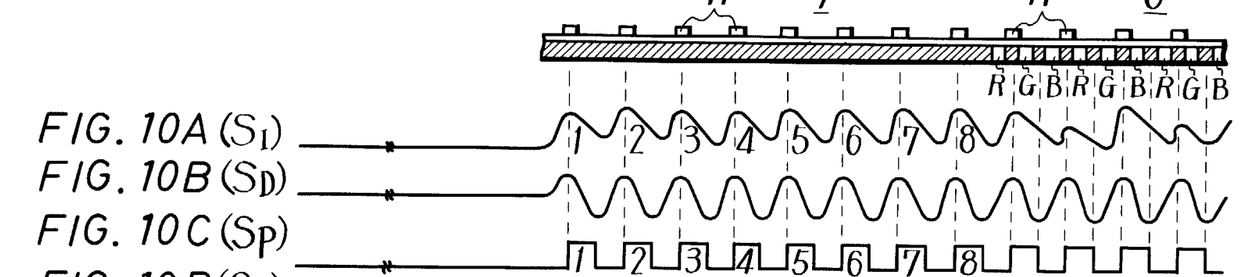
FIGS. 10A to 10R are waveform diagrams to which reference will be made in explaining the operation of the television receiver shown in FIG. 8.

In the example of FIG. 8, a horizontal line synchronizing signal $P_H$ (FIG. 10L) is fed to a monostable multivibrator 21 when then produces a positive-going pulse $M_1$ (FIG. 10M) having a constant pulse width. The pulse $M_1$ is fed to the set input S of a flip-flop circuit 22 which is then set by the negative-going trailing edge of pulse $M_1$ and produces a set output $F_1$ of "1" (FIG. 10N) and a reset output $\overline{F}_1$ of "0" (FIG. 10O). The set output $F_1$ enables or makes conductive a reference gate circuit 31 which is supplied with a DC voltage, whose value is previously adjusted by a variable resistor 32. The DC voltage is applied through enabled reference gate circuit 31 and an amplifier 33 to a first grid 18 of the cathode ray tube 4, so that the electron beam 14 is thereby controlled to have a constant value of intensity as it scans the index phosphor stripes 11 on the beam scanning run-in area. The constant electron beam 14 causes photodetector 17 to produce index signal $S_I$ (FIG. 10A).

The index signal $S_I$ is fed to a band pass filter 41 to produce a generally sinusoidal reference signal $S_D$ (FIG. 10B) with a fundamental frequency equal to the frequency of the index signal $S_I$. Reference signal $S_D$ is fed to a phase locked loop circuit 43 which then produces a pulse signal $S_L$ synchronized with the reference signal $S_D$, as shown on FIG. 10D. The phase locked loop circuit 43 includes a voltage controlled oscillator 44, providing oscillation pulses which are frequency divided by two in a frequency divider 45. The frequency divided pulses are fed to a phase shifter 46 for phase adjustment. The phase-adjusted pulses are fed to a phase comparator 47 to be phase-compared with the signal $S_D$ applied thereto from the band pass filter 41. The compared error voltage from phase comparator 47 is applied through a low pass filter 48 as the control voltage for voltage controlled oscillator 44 which thus produces the pulses $S_L$ phase locked to twice the frequency of reference signal $S_D$. The pulses $S_L$ are fed to a frequency divider 60 to be divided by three and phase shifted to produce three color gating pulse outputs $F_R$, $F_G$ and $F_B$ which are 120 degrees apart.

The index signal $S_I$ from the photodetector 17 is also applied to a pulse generating circuit 50 from which index pulses $S_P$ (FIG. 10C) are obtained. Index pulses $S_P$ are fed to one input of a counter 51, which is further supplied with an enable signal constituted by the set output $F_1$ (FIG. 10N) of flip-flop circuit 22. While the set output $F_1$ is "1" following a horizontal synchronizing pulse $P_H$, the index pulses $S_P$ corresponding to run-in or marginal portion 9 are counted by counter 51. When a predetermined number of the index pulses $S_P$, such as eight, in the example of FIGS. 5 and 10C, is counted by counter 51, the latter produces a negative pulse $S_C$ (FIG. 10E).

Figures 10D, 10E, 10F, 10G, 10I:
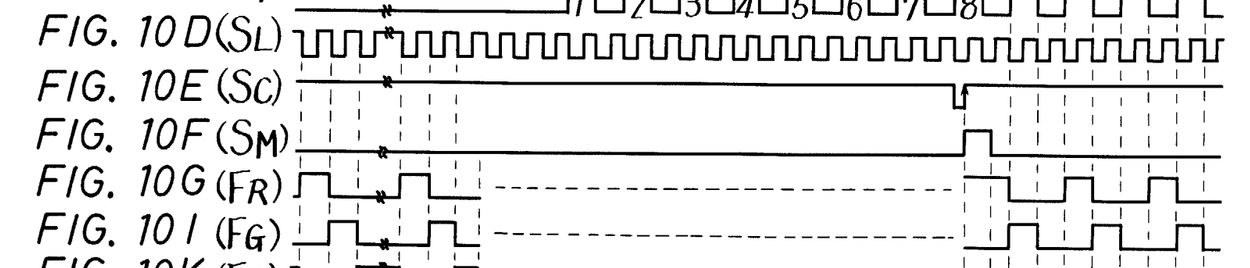
Figures 10K, 10L, 10M, 10N, 10O, 10P, 10Q, 10R:
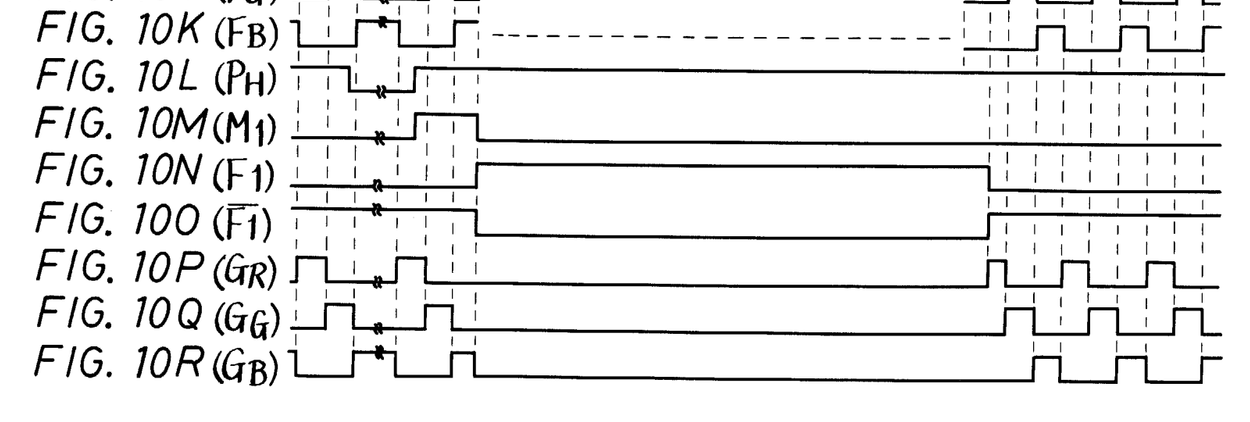

The output pulse $S_C$ from counter 51 is fed to a monostable multivibrator 52 which then produces a trigger pulse $S_M$ (FIG. 10F) at the positive-going trailing edge of the pulse $S_C$ represented by an arrow on FIG. 10E. The pulse $S_M$ has a width suitable to match the timing.

The trigger pulse $S_M$ is fed to the reset input R of flip-flop circuit 22 which is then reset at the trailing edge of the pulse $S_M$. Thus, the set output $F_1$ from flip-flop circuit 22 becomes "0" and the reset output signal $\overline{F}_1$ (FIG. 10O) therefrom becomes "1". When the output $F_1$ becomes "0", reference gate circuit 31 is inhibited. In addition, output $\overline{F}_1$, becoming "1" at this time, enables one input of each of AND gates 71–73.

The pulse $S_M$ also synchronizes the frequency divider 60 which, as previously indicated, frequency divides the pulse signal $S_L$ from phase locked loop 43 by $\frac{1}{3}$ and produces the red, green and blue color gating pulses $F_R$, $F_G$ and $F_B$ differing in phase by 120°, beginning with the color gating pulse required for the first required color just inside the image area (red in the example).

Figure 9:
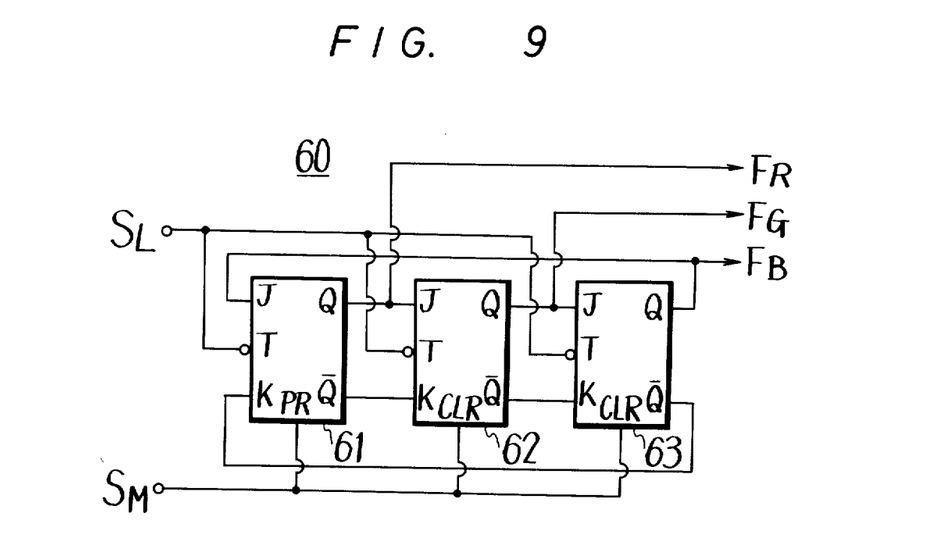
FIG. 9 is a detailed block diagram showing a frequency divider employed in the receiver of FIG. 8.

An example of a circuit that may constitute frequency divider 60 is described with reference to FIG. 9, where frequency divider 60 is in the form of a ring counter consisting of three stages of JK flip-flop circuits 61, 62 and 63 with the set Q and reset $\overline{Q}$ outputs of each flip-flop circuit connected to J and K inputs respectively of the following flip-flop circuit. The set Q and reset $\overline{Q}$ outputs of JK flip-flop circuit 63 are fed back to the J and K inputs, respectively, of flip-flop circuit 61. The double frequency signal $S_L$ is applied in parallel to the toggle inputs of all of flip-flop circuits 61 to 63. As is well known in the art, upon the occurrence of a negative going trailing edge of a signal at the toggle input of a JK flip-flop circuit, the JK flip-flop circuit assumes the set condition if a "1" exists only at its J input, a reset condition if a "1" exists only at its K input and is not affect if "0" exists at both its J and K inputs.

The trigger pulse $S_M$ is fed to the flip-flop circuits 61 to 63 to preset them to a value which will begin the scanning of the color phosphor stripes with the correct color signal. Thus, the flip-flop circuit 61 is set by the trigger pulse $S_M$ and the flip-flop circuits 62 and 63 are reset by the pulse $S_M$, as indicated on FIGS. 10G, 10I and 10K. The Q-outputs $F_R$, $F_G$ and $F_B$ from flip-flop circuits 61, 62 and 63, respectively, which are used to gate the three colors, that is, red, green and blue respectively, are preset to $F_R=1$ and $F_G=F_B=0$. The frequency divider 60 is preset at the end of the run-in area to first gate the red color until the first red color phosphor stripe R is scanned.

After the scanning beam scans the first red color phosphor stripe in image area 6, the pulse signal $S_L$ at the toggle inputs T of the JK flip-flop circuits find the J input of flip-flop circuit 62 and the K input of flip-flop circuits 61 and 63 enabled. Consequently, at the negative going edge of the signal $S_L$ following the presetting operation, flip-flop circuit 61 is reset and flip-flop circuit 62 is set. No change takes place in flip-flop circuit 63 since both its inputs were "0" at the occurrence of the signal $S_L$. Thus, the Q-output $F_R$ of flip-flop circuit 61 becomes "0", the Q-output $F_G$ of flip-flop circuit 62 becomes "1" and the Q output $F_B$ of flip-flop circuit 63 remains "0". At the next negative-going edge of signal $S_L$, the Q-output $F_G$ becomes "0" and the Q-output $F_B$ becomes "1". To complete the sequence, at the next negative going edge of signal $S_L$, the Q-outputs of the flip-flop circuits 61 to 63 return to their preset conditions. Thereafter, the above sequence is repeated across the image area 6.

Accordingly, the Q-inputs $F_R$, $F_G$ and $F_B$ of the JK flip-flop circuits 61 to 63 become sequentially "1" at the proper times while the electron beam 14 scans the red, green and blue color phosphor stripes R, G and B of the image area 6.

Referring again to FIG. 8, the Q-output pulse signals $F_R$, $F_G$ and $F_B$ from the frequency divider 60 are shown to be applied to the second inputs of AND gates 71, 72 and 73, respectively. Flip-flop circuit 22 is reset by the trailing edge pulse $S_M$ from monostable multivibrator 52 and the reset output $\overline{F}_1$ (FIG. 10O) becomes "1" for enabling one input of each of AND gates 71 to 73. The gating pulses $F_R$, $F_G$ and $F_B$ are thus passed through the AND gates 71 to 73 as color gate signals $G_R$, $G_G$ and $G_B$ (FIGS. 10P, 10Q and 10R) while the electron beam 14 scans the image area 6. Color gate signals $G_R$, $G_G$ and $G_B$ sequentially enable gate circuits 34, 35 and 36, respectively when the respective color gate signals are "1". Thus, red, green and blue primary color signals $E_R$, $E_G$ and $E_B$ are sequentially passed through the gate circuits 34 to 36 and fed through amplifier 33 to the first grid 18 of the color cathode ray tube 4 in step with the electron beam crossing corresponding color stripes.

Accordingly, the electron beam 14 is density-modulated by the red primary color signal $E_R$ when the beam 14 scans a red phosphor stripe R, by the green primary color signal $E_G$ when the beam 14 scans a green phosphor stripe G, and by the blue primary color signal $E_B$ when the beam 14 scans a blue phosphor stripe B to achieve color synchronization.

Figure 7A:
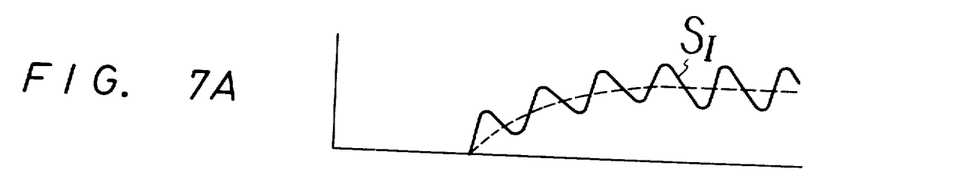
FIGS. 7A to 7C are waveform diagrams to which reference will be made in explaining the operation of the embodiments of the invention shown in FIGS. 5 and 6.

A possible problem which may arise with the embodiment shown in FIG. 5 is that noise pulses occurring while the beam scans the index stripes 11 in the run-in area 9 may be erroneously counted as index stripes so that the counter 51 prematurely arrives at its required count and causes faulty color synchronization in the viewing area 6. This problem arises at least partially due to the shape of the index signal $S_I$ and in FIG. 7A.

The DC level of the output of the photodetector 17 is approximately zero before the first index stripe in the run-in area is crossed or energized. This is shown by the zero signal level in the left portion of FIG. 7A. After the first index stripe is crossed resulting in the first positive alternation, the DC level of the index signal $S_I$ does not return to zero, but instead remains above zero due to the residual phosphorescence of the first index stripe after the scanning electron beam has moved past it. After the second alternation of the index signal $S_I$ its DC level is slightly higher than after the first alternation due to the phosphorescent contribution of both the first and the second index stripes. This elevation of the DC level continues until a stable condition is attained at which the phosphorescence added by scanning each additional index stripe is balanced by the phosphorescent decay of all the index stripes previously scanned. Such a stable DC level is attained in FIG. 7A after the fourth alternation in the index signal $S_I$. The result of this start-up elevation of the DC level is similar to a sinusoid, shown in solid line, superimposed on a low-frequency signal, shown in dashed line. The low-frequency component may be detected as a phase error in the phase locked loop which can prevent accurate color synchronization. In addition, at zero or very low DC levels, the index signal may contain sufficient noise to permit false noise triggering.

One solution to this problem is shown in FIG. 6 in which a broad phosphor stripe 13 covers the extreme marginal region of the run-in area. The broad phosphor stripe 13 elevates the DC level to the desired average level and provides a relatively strong constant signal in that location to avoid triggering by noise. Closer in, index stripes 11 are provided having the usual width and pitch. In order that the average signal detected from the broad phosphor stripe 13 be approximately equal to the average level closer to the image area 6, the excited brightness of the broad phosphor stripe 13 is decreased to make its average level approximately equal to the average level due to the index phosphor stripes 11. For example, if the ratio of the width to the pitch of the index phosphor stripes 11 is 1:4, the brightness of the broad phosphor stripe 13 when excited is made ¼ of the brightness of an individual index phosphor stripe 11 when the latter is excited. This result is shown in FIG. 7C wherein the average or continuous level at the left-hand portion of the curve indicates the level obtained from the broad phosphor stripe 13 after it reaches the stable condition and the average level, shown in dashed line to the right, indicates the average level of the signal received from the index phosphor stripes 11.

Figure 11:
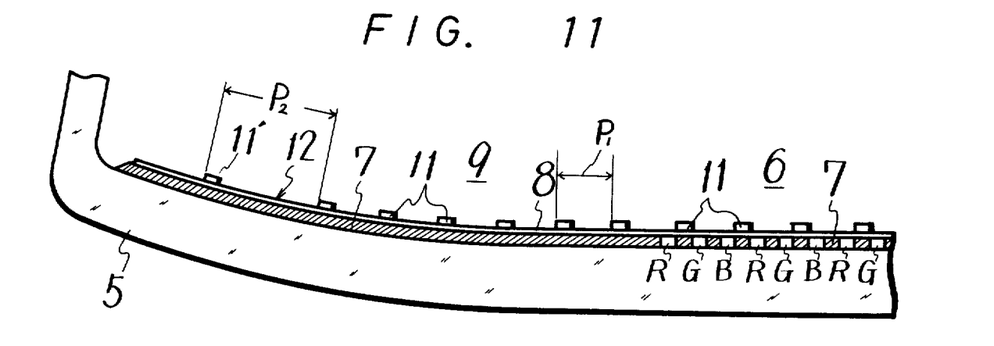
FIG. 11 is another cross-sectional view similar to FIG. 4, but showing still another embodiment of this invention.
Figure 12:
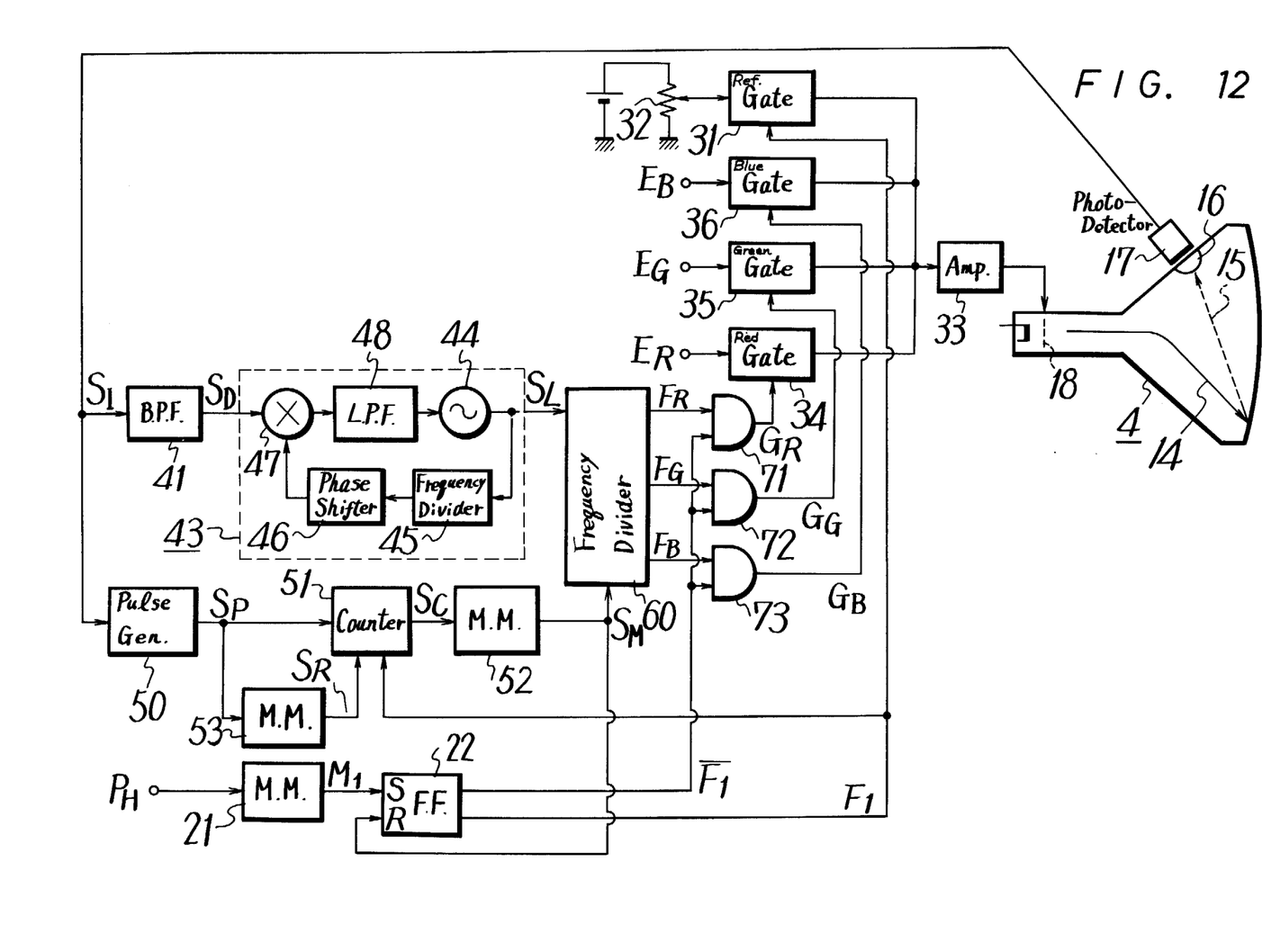
FIG. 12 is a block diagram showing a television receiver in which the beam index color cathode ray tube of FIG. 11 is employed.

FIG. 11 shows a further embodiment of a beam index color cathode ray tube according to the present invention which, in combination with the circuit shown in FIG. 12, solves the problem of false triggering by noise occurring when the beam is scanning the extremes of the run-in area. As shown in FIG. 11, the structure of the cathode ray tube in the image area is the same as described in preceding embodiments. In addition, most of the index phosphor stripes 11 in the run-in area 9 are spaced at substantially the same pitch as those in the image area 6. This is true, in the illustrative embodiment of FIG. 11, for the first six index stripes 11 outward from the image area 6. The seventh index phosphor stripe 11' outward from the image area is spaced outward by a pitch $P_2$ which is wider than the pitch $P_1$ closer in. As illustrated, the wider pitch is approximately equal to twice the pitch closer in but other values, such as 1.5 could be chosen without departing from the scope of the invention. Index phosphor stripe 11' acts to provide a resetting signal to the circuit shown in FIG. 12 in preparation for counting thereby of the six index phosphor stripes 11 which, in this example, precede the beam entry into the image area 6.

Figure 7B:
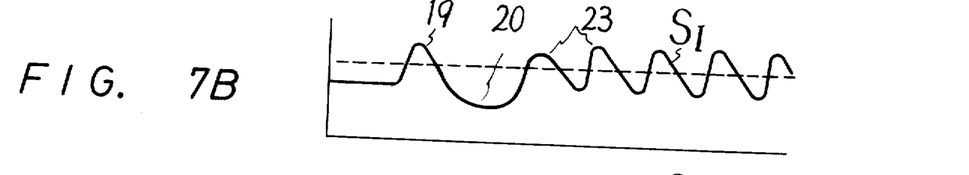
Figure 7C:
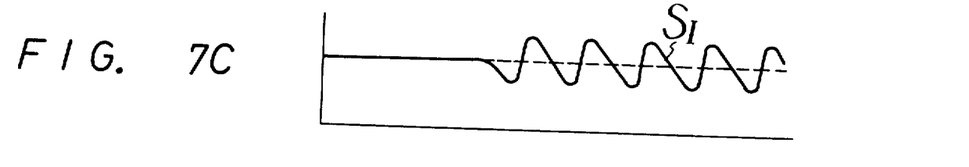

FIG. 7B shows the index signal $S_I$ which results from the scanning by an electron beam over the index stripes of the beam indexed cathode ray tube shown in FIG. 11. The first pulse 19 is generated by the outlying index phosphor stripe 11', the gap 20 results from the wide pitch $P_2$ between the index phosphor stripe 11' and the first of the close-spaced index phosphor stripes 11. The sinusoidal signals 23 are the equally spaced signals from the index phosphor stripes 11. Although not shown in FIG. 11, a plurality of index phosphor stripes 11 may precede the stripe 11' to elevate the DC level to its stable condition shown in FIG. 7B. Any errors which may arise due to noise or the low-frequency superimposed signal during start-up are eliminated when the electron beam scans over the wide pitch $P_2$ as will be explained.

Turning now to FIG. 12, it will be seen that the television receiver there illustrated is identical to that shown in FIG. 8 except for the addition of a retriggerable monostable multivibrator 53 which, when triggered by the positive-going leading edge of an index pulse $S_P$ (FIG. 13C), generates a pulse output $S_R$ (FIG. 13E) which has a period $\tau$ slightly longer than the period of the index pulse $S_P$ during scanning of index phosphor stripes 11 at normal pitch. The trailing edge of the pulse $S_R$ is capable of resetting counter 51. However, if pulses $S_P$ arrive at the input of retriggerable monostable multivibrator 53 before the end of the period $\tau$, the retriggerable monostable multivibrator maintains its output $S_R$ at a high or "1" level and consequently counter 51 is not reset.

Figures 13A, 13B:
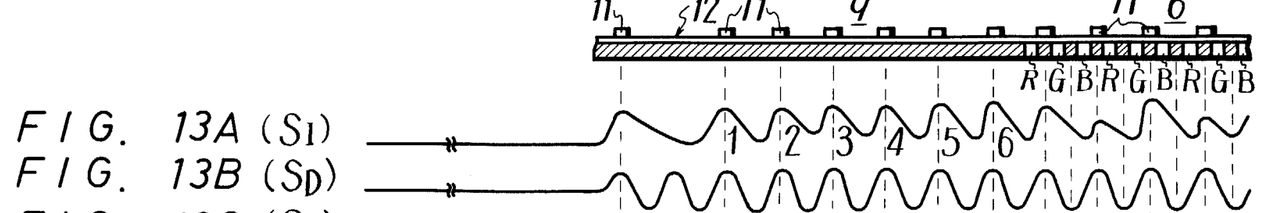
FIGS. 13A to 13S are waveform diagrams to which reference will be made in explaining the operation of the embodiment of FIGS. 11 and 12.
Figures 13C, 13D, 13E:
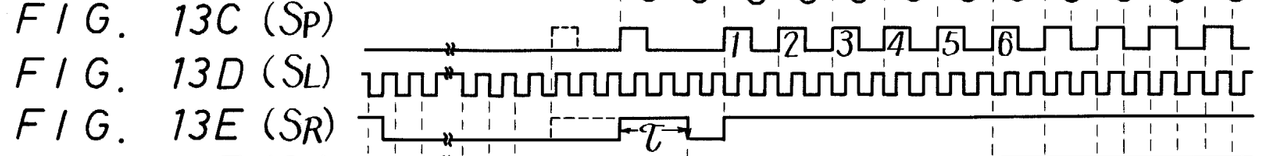
Figures 13F, 13G, 13H, 13J, 13L:
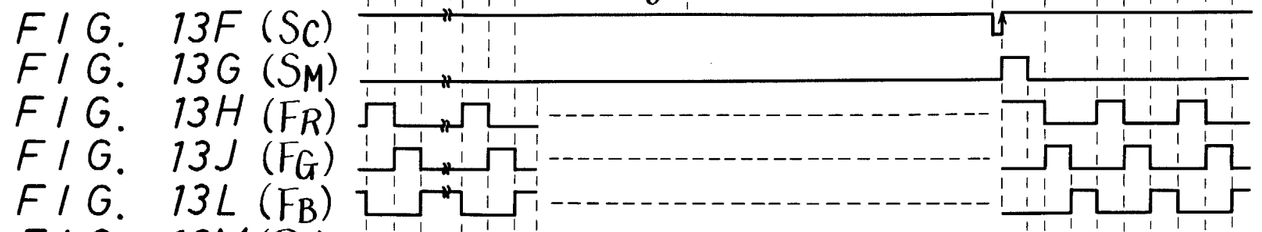
Figures 13M, 13N, 13O, 13P:
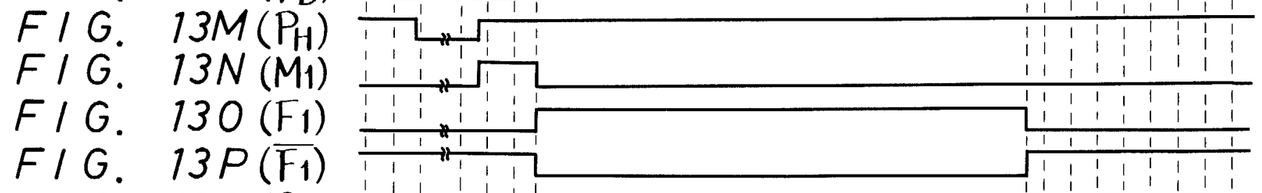
Figures 13Q, 13R, 13S:
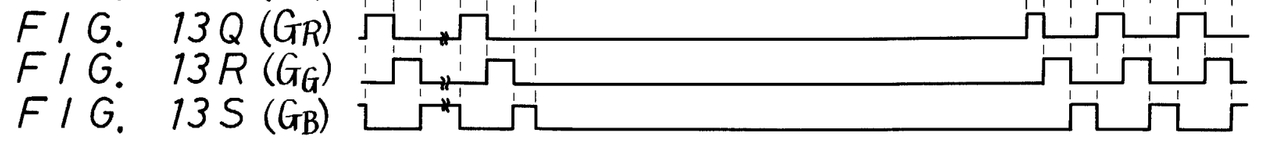

This sequence is illustrated in FIGS. 13A-13E. The index pulse $S_P$ in FIG. 13C resulting from index phosphor stripe 11' is shown unnumbered. The pulse $S_R$ (FIG. 13E) is generated by the positive going leading edge of this index pulse and endures for a period $\tau$. At the end of the period $\tau$, indicated by the downward pointing arrow, the signal $S_R$ applied to counter 51 resets the latter in preparation for scanning across the first of the phosphor index stripes 11. Thus the counting of index pulses $S_P$, shown by the numbered pulses in FIG. 13C, is properly started at 1 by existence of the wide spaced index phosphor stripe 11'. At the end of counting the predetermined number of index phosphor stripes 11, in this example six, the sequencing of red, green and blue control signals is performed as previously explained. As shown in FIG. 13E, the signal $S_R$ is maintained at constant high level throughout the region of scanning index phosphor stripes 11 having the standard pitch $P_1$. Consequently, the required negative going trailing edge on pulse $S_R$ to reset counter 51 is not generated.

In the example of FIG. 12, even if a false index pulse is produced by noise where no index phosphor stripe is formed, as for example indicated in dotted lines in FIG. 13C, and the output signal $S_R$ from the retriggerable monostable multivibrator 52 becomes "1" as a result of this false index pulse, for example, as indicated by the dotted line on FIG. 13E, the output signal $S_R$ still terminates at a time $\tau$ after sensing the index phosphor stripe 11' due to the extra width of the wide pitch $P_2$ and hence the counter 51 is reset at the proper time. Thus, color synchronization is maintained even when spurious noise pulses cause false triggering at the extremities or extreme margins of the screen.

It should be clear to one skilled in the art that a similar result can be achieved within the scope of the present invention by placing index phosphor stripes closer together rather than further apart in order to have the counter 51 properly reset in preparation for counting the required number of index pulses $S_P$.

Having described specific illustrative embodiments of the invention with reference to the accompanying drawings, it is to be understood that the invention is not limited to those precise embodiments, and that various changes and modifications may be effected therein by one skilled in the art without departing from the spirit or scope of the invention as defined in the appended claims.

What is claimed is:

1. A cathode ray tube system comprising a cathode ray tube having a screen, means for producing an electron beam scanning said screen, means for varying the intensity of said beam, said screen having an image area for generating an image and a run-in area arranged at a margin to one side of said image area considered in the scanning direction of said beam, said image area having a repetitive pattern of plurality of groups of color phosphor elements, each element of a group producing light of a different color when excited, the groups being arranged side-by-side in said scanning direction and having a first pitch, a first set of index stripes in said image area, said first set of index strips being spaced apart in the direction that said groups are arranged side-by-side and having a second pitch, said run-in area having a second set of index stripes parallel to said first set of index stripes and having said second pitch at least between said index stripes of the second set adjacent said margin of the image area, means for generating index signal pulses in response to said electron beam scanning over said second set of index stripes and then over said first set of index stripes, means responsive to counting of a predetermined number of said index signal pulses resulting from scanning of the index stripes in said second set of synchronize the time-phase position of said means for varying the intensity of the beam at the beginning of scanning of said image area by said electron beam.

2. A cathode ray tube system according to claim 1, wherein said color phosphor elements are stripe-shaped and extend parallel with said index stripes.

3. A cathode ray tube system according to claim 1, wherein said second pitch is $(3n \pm 1)/3$ times said first pitch where n is an integer including zero.

4. A cathode ray tube system according to claim 1, wherein said second set of index stripes includes at least one pair of index stripes spaced from said image area and having a pitch therebetween greater than said second pitch.

5. A cathode ray tube system according to claim 1, wherein said second set of index stripes includes at least one wide index stripe disposed at least said predetermined number of index stripes from said image area, said wide index stripe having a width in the scanning direction exceeding said second pitch.

6. A cathode ray tube system according to claim 1, wherein said second pitch is equal to ⅔ times said first pitch.

7. A beam index cathode ray tube comprising an envelope including a screen, means for scanning an electron beam across said screen, an image area on said screen having repetitive sets of parallel color phosphor stripes disposed thereon, each color phosphor stripe of a set thereof emitting light of a respective different color when excited by impingement of said beam thereon, means for controlling the intensity of said beam in accordance with repetitive cycles of color signals respectively corresponding to said color phosphor stripes of said sets, said sets having a first pitch, a run-in area contiguous with an edge at one side of said image area, a first set of index stripes on said image area parallel to said color phosphor stripes, said first set of index stripes having a second pitch different from said first pitch, a second set of index stripes on said run-in area having said second pitch, means responsive to said electron beam scanning over said first and second sets of index stripes for generating index signal pulses, counting means for counting the index signal pulses resulting from the scanning by said beam of said second set of index stripes, and means responsive to the counting of a predetermined number of the index signal pulses by said counting means for establishing synchronism of said repetitive cycles of the color signals with said repetitive sets of parallel color phosphor stripes at the commencement of the scanning of said image area by said beam.

8. A beam-index cathode ray tube according to claim 7, in which at least one index stripe in said run-in area is disposed at least a plurality of pitches from said image area and is spaced from at least one nearest other index stripe by a third pitch which substantially exceeds said second pitch.

9. A beam-index cathode ray tube according to claim 8, wherein said third pitch is greater than 1.5 times said second pitch.

10. A beam-index cathode ray tube according to claim 9, wherein said third pitch is 2 times said second pitch.

11. A beam-index cathode ray tube according to claim 10, further comprising at least one wide index stripe in said run-in area disposed a plurality of second pitches from said image area, said wide index stripe being at least as wide as said second pitch.

12. A beam-index cathode ray tube according to claim 11, wherein the instantaneous level of the index signal pulse resulting from scanning of said at least one wide index stripe is lower than the instantaneous level of the index signal pulse resulting from an individual one of said second set of index stripes when excited by said electron beam.

13. A beam-index cathode ray tube according to claim 12, wherein said instantaneous level of the index signal pulse that results from excitation of said wide index stripe is equal to the instantaneous level of the index signal pulse that results from excitation by said beam of one index stripe of said second set times the width of one index stripe of said second set divided by said second pitch.

14. A control circuit for a beam index cathode ray tube of the type which generates an index signal indicative of the position of a scanning beam, comprising: means for generating a pulse signal having a frequency related to the frequency of said index signal, counter means enabled by a synchronizing signal for counting cycles of said index signal, said counter means being effective to generate a trigger signal in response to counting a predetermined number of said cycles, and frequency divider means operative in response to said pulse signal to generate a sequential plurality of color control signals for sequentially controlling the application of color signals to said cathode ray tube, said trigger signal being effective to preset said frequency divider means to a predetermined condition whereby synchronization of said plurality of color control signals is achieved.

15. A control circuit according to claim 14, wherein said means for generating a pulse signal includes a phase locked loop fed with said index signal.

16. A control circuit according to claim 15, wherein the frequency of said pulse signal is an integral multiple of the frequency of said index signal, and said integral multiple is indivisible by three.

17. A control circuit according to claim 16, further comprising resetting means for resetting said counter means in response to a characteristic of said index signal.

18. A control circuit according to claim 17, wherein said characteristic of the index signal is at least two cycles of said index signal having a different spacing that a standard spacing between the remaining cycles.

19. A control circuit according to claim 18, wherein said different spacing is greater than said standard spacing.

20. A control circuit according to claim 17, wherein said characteristic is a gap in said index signal.

21. A control circuit according to claim 14, wherein said frequency divider means is a three stage ring counter.

22. A beam index television system comprising: a beam index cathode ray tube having a screen, an image area on said screen having repetitive triads of parallel color phosphor stripes, said triads having a first pitch, a run-in area contiguous with an edge of said image area, a set of index stripes on said run-in area and said image area, said set of index stripes having a second pitch not integrally related to said first pitch, a predetermined number of said set of index stripes being on said run-in area, means for generating and scanning an electron beam across said screen, means for generating an index signal responsive to said electron beam crossing said index stripes, means for generating a pulse signal responsive to said index signal, counter means enabled by a television synchronizing signal for counting cycles of said index signal and for generating a trigger signal upon counting said predetermined number, and frequency divider means operative in response to said pulse signal to generate a plurality of color control signals for sequentially controlling application of color signals to said cathode ray tube, said trigger signal being effective to preset said frequency divider means to a predetermined condition whereby synchronization between said plurality of color control signals and scanning of said color phosphor stripes is achieved in said image area.

23. A beam index television system according to claim 22, further comprising at least one wide index stripe in said run-in area disposed beyond said predetermined number of index stripes from said image area and having a width at least as wide as said second pitch.

24. A beam index television system according to claim 22, further comprising at least one index stripe in said run-in area disposed at least a plurality of said second pitches from said image area and which is spaced from at least one other nearest index stripe by a third pitch which is substantially different from said second pitch.

25. A beam index television system according to claim 24, wherein said third pitch substantially exceeds said second pitch.

26. A beam index television system according to claim 24, further comprising resettable means responsive to said third pitch for resetting said counter means.

27. A beam index television system according to claim 22; in which said means for generating a pulse signal includes a phase locked loop receiving said index signal and being operative to generate said pulse signal with a frequency twice that of said index signal and in phase locked relation to the latter.

28. A beam index television system according to claim 22; further comprising gate means for establishing a predetermined electron beam intensity during scanning of said run-in area, and additional gate means controlled by said color control signals during scanning of said image area to permit control of the electron beam intensity by said color signals.

* * * * *